United States Patent
Brown et al.

(10) Patent No.: US 9,280,833 B2
(45) Date of Patent: Mar. 8, 2016

(54) TOPOLOGY DETERMINATION FOR NON-OVERLAPPING CAMERA NETWORK

(71) Applicant: International Business Machines Corporation, Armonk, NY (US)

(72) Inventors: Lisa M. Brown, Pleasantville, NY (US); Ankur Datta, White Plains, NY (US); Rogerio S. Feris, Hartford, CT (US); Sharathchandra U. Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 13/784,974

(22) Filed: Mar. 5, 2013

(65) Prior Publication Data

US 2014/0253732 A1    Sep. 11, 2014

(51) Int. Cl.
| | |
|---|---|
| *H04N 5/225* | (2006.01) |
| *H04N 7/18* | (2006.01) |
| *G06F 9/45* | (2006.01) |
| *G06K 9/00* | (2006.01) |
| *G06T 7/20* | (2006.01) |
| *G06T 7/00* | (2006.01) |

(52) U.S. Cl.
CPC ............. G06T 7/2093 (2013.01); G06T 7/0018 (2013.01); *G06T 2207/10016* (2013.01); *G06T 2207/10024* (2013.01); *G06T 2207/20076* (2013.01); *G06T 2207/30241* (2013.01)

(58) Field of Classification Search
CPC ............. H04N 5/225; H04N 7/18; G06F 9/45
See application file for complete search history.

(56) References Cited

U.S. PATENT DOCUMENTS

| | | | |
|---|---|---|---|
| 6,690,374 B2 | 2/2004 | Park et al. | |
| 6,862,729 B1 * | 3/2005 | Kuch et al. | 717/158 |
| 7,286,157 B2 * | 10/2007 | Buehler | 348/143 |
| 7,450,735 B1 | 11/2008 | Shah et al. | |

(Continued)

FOREIGN PATENT DOCUMENTS

CN    102236785 A    11/2011

OTHER PUBLICATIONS

Alahi et al, Cascade of Descriptors to Detect and Track Objects Across Any Network of Cameras, Computer Vision and Image Understanding, vol. 114, No. 6, pp. 624-640, Jun. 2010, Academic Press.

(Continued)

*Primary Examiner* — Sath V Perungavoor
*Assistant Examiner* — Patricia I Young
(74) *Attorney, Agent, or Firm* — Patrick J. Daugherty; Driggs, Hogg, Daugherty & Del Zoppo Co., LPA

(57) ABSTRACT

Image-matching tracks the movements of the objects from initial camera scenes to ending camera scenes in non-overlapping cameras. Paths are defined through scenes for pairings of initial and ending cameras by different respective scene entry and exit points. For each of said camera pairings a combination path having a highest total number of tracked movements relative to all other combinations of one path through the initial and ending camera scene is chosen, and the scene exit point of the selected path through the initial camera and the scene entry point of the selected path into the ending camera define a path connection of the initial camera scene to the ending camera scene.

21 Claims, 5 Drawing Sheets

(56) References Cited

U.S. PATENT DOCUMENTS

2006/0188131 A1* 8/2006 Zhang et al. .................. 382/103
2009/0268033 A1 10/2009 Ukita
2010/0157064 A1 6/2010 Cheng et al.
2010/0231723 A1 9/2010 Nam et al.
2011/0141288 A1 6/2011 Huang et al.
2012/0046044 A1 2/2012 Jamtgaard et al.

OTHER PUBLICATIONS

Ellis et al, Learning a Multi-Camera Topology, Joint IEEE Workshop on Visual Surveillance and Performance Evaluation of Tracking and Surveillance (VS-PETS), pp. 165-171, 2003.

* cited by examiner

TOPOLOGY DETERMINATION FOR NON-OVERLAPPING CAMERA NETWORK

FIELD OF THE INVENTION

The present invention relates to image analytics technology. More specifically, the present invention relates to applying computer vision techniques to automatically differentiate and track objects within video image data defined by inputs from different, non-overlapping camera inputs.

BACKGROUND

Automated systems may use video analytics to process video data to determine object movements and other events of concern. Such systems may use background subtraction (BGS) mask processes to distinguish object items as foreground features in the video data, objects that are distinct from a background model of the image data and discernible within video imagery. Information processing systems may receive images or image frame data captured by video cameras or other image capturing devices, wherein individual frames of video data are processed or analyzed by an object detection system in the information processing system to identify and track the presence and movement of objects detected within the video data over time.

Tracking an object as it progress from one camera view to another presents a number of challenges. For example, the same object found within the images of one camera may subsequently possibly appear in the images of any of a group of different cameras that are each located in different locations. Tracking an object requires recognizing which of subsequent possible camera views the object is in, as distinguished from other objects in each of the other camera views. Also, a moving object can transition from one camera into any of many other cameras or remain within any one camera over a variety of different time periods that may each be unpredictable or undeterminable. Further complexities may be introduced if cameras are not placed uniformly, or if objects do not travel at the same speed. Different moving objects may also present similar appearances that may be difficult to distinguish through analyzing visual attributes of the image data, for example one silver sedan may not be distinguishable from another silver sedan based on visual attributes alone, particularly at certain image resolutions or lighting levels.

BRIEF SUMMARY

In one aspect of the present invention, a method for calibrating image data from non-overlapping cameras includes a processing unit tracking individual objects distinguished within scenes of image data from non-overlapping cameras. The non-overlapping camera image scenes are geographically remote and distinct from each other and do not overlap, so that an object visible within any one scene cannot be visible within a scene from another camera at the same time. The method further includes iterative across-camera image-matching that tracks the movements of the objects in frame data of scenes of initial cameras to ending cameras subsequent-in-time as defined by tracks of the objects moving from the initial camera scene to the ending camera scene. Paths are defined through scenes for pairings of initial and ending cameras by different respective scene entry and exit points. For each of said camera pairings a combination path having a highest total number of tracked movements relative to all other combinations of one paths through the initial and ending camera scene is chosen, and the scene exit point of the selected path through the initial camera and the scene entry point of the selected path into the ending camera define a path connection of the initial camera scene to the ending camera scene.

In another aspect, a method provides a service for calibrating image data from non-overlapping cameras which includes a processing unit tracking individual objects distinguished within scenes of image data from non-overlapping cameras. The method includes integrating computer-readable program code into a computer system comprising a processing unit, a computer readable memory and a computer readable tangible storage medium. Computer readable program code is embodied on the computer readable tangible storage medium and comprises instructions that, when executed by the processing unit via the computer readable memory, cause the processing unit to track individual objects distinguished within scenes of image data from non-overlapping cameras. The non-overlapping camera image scenes are geographically remote and distinct from each other and do not overlap, so that an object visible within any one scene cannot be visible within a scene from another camera at the same time. The method further includes iterative across-camera image-matching that tracks the movements of the objects in frame data of scenes of initial cameras to ending cameras subsequent-in-time as defined by tracks of the objects moving from the initial camera scene to the ending camera scene. Paths are defined through scenes for pairings of initial and ending cameras by different respective scene entry and exit points. For each of said camera pairings a combination path having a highest total number of tracked movements relative to all other combinations of one paths through the initial and ending camera scene is chosen, and the scene exit point of the selected path through the initial camera and the scene entry point of the selected path into the ending camera define a path connection of the initial camera scene to the ending camera scene.

In another aspect, a system has a processing unit, computer readable memory and a tangible computer-readable storage medium with program instructions, wherein the processing unit, when executing the stored program instructions, tracks individual objects distinguished within scenes of image data from non-overlapping cameras. The non-overlapping camera image scenes are geographically remote and distinct from each other and do not overlap, so that an object visible within any one scene cannot be visible within a scene from another camera at the same time. The method further includes iterative across-camera image-matching that tracks the movements of the objects in frame data of scenes of initial cameras to ending cameras subsequent-in-time as defined by tracks of the objects moving from the initial camera scene to the ending camera scene. Paths are defined through scenes for pairings of initial and ending cameras by different respective scene entry and exit points. For each of said camera pairings a combination path having a highest total number of tracked movements relative to all other combinations of one path through the initial and ending camera scene is chosen, and the scene exit point of the selected path through the initial camera and the scene entry point of the selected path into the ending camera define a path connection of the initial camera scene to the ending camera scene.

In another aspect, a computer program product has a tangible computer-readable storage medium with computer readable program code embodied therewith, the computer readable program code comprising instructions that, when executed by a computer processing unit, cause the computer processing unit to track individual objects distinguished within scenes of image data from non-overlapping cameras.

The non-overlapping camera image scenes are geographically remote and distinct from each other and do not overlap, so that an object visible within any one scene cannot be visible within a scene from another camera at the same time. The method further includes iterative across-camera image-matching that tracks the movements of the objects in frame data of scenes of initial cameras to ending cameras subsequent-in-time as defined by tracks of the objects moving from the initial camera scene to the ending camera scene. Paths are defined through scenes for pairings of initial and ending cameras by different respective scene entry and exit points. For each of said camera pairings a combination path having a highest total number of tracked movements relative to all other combinations of one path through the initial and ending camera scene is chosen, and the scene exit point of the selected path through the initial camera and the scene entry point of the selected path into the ending camera define a path connection of the initial camera scene to the ending camera scene.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
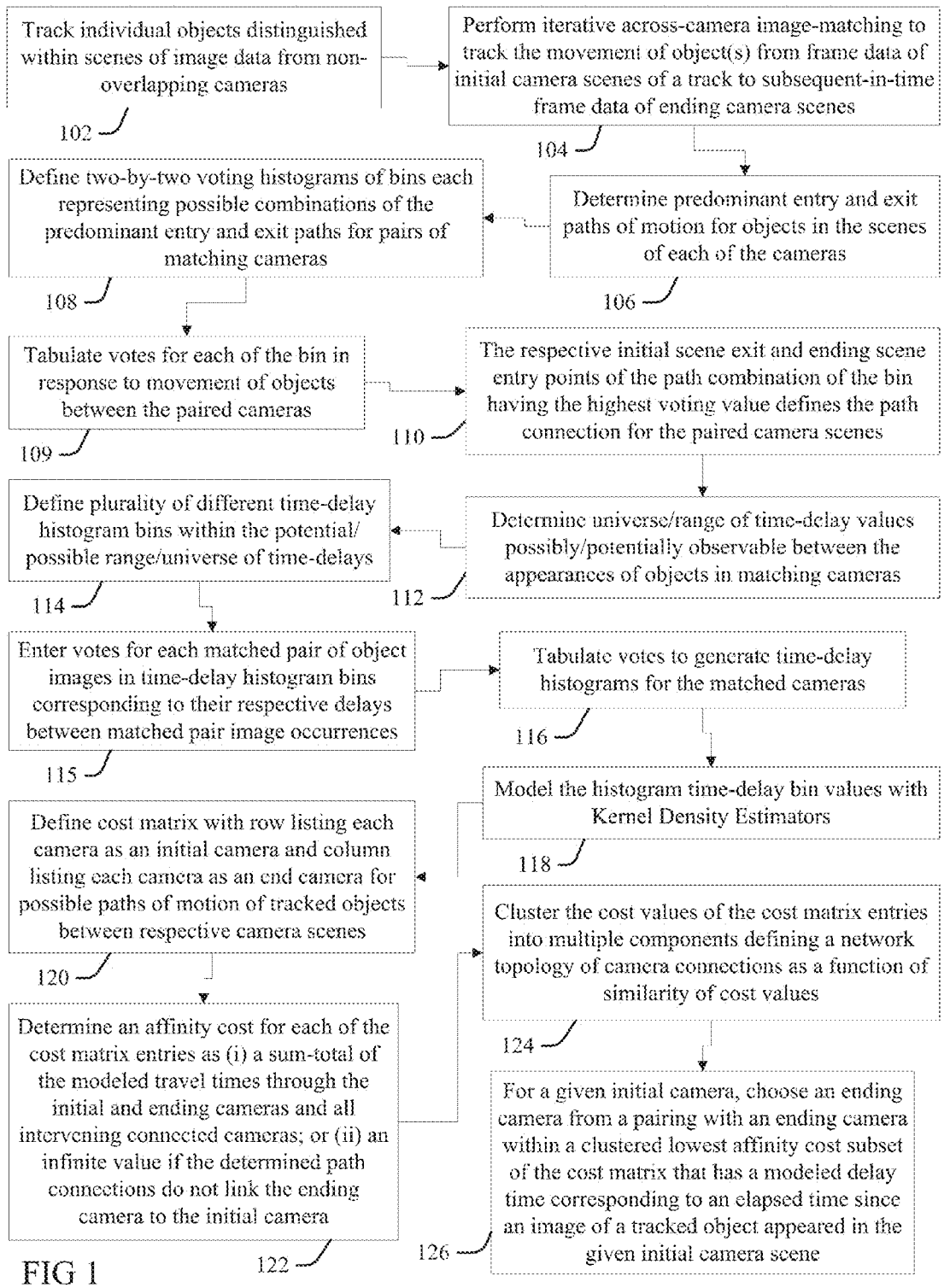
FIG. 1 is a block diagram illustration of a method, system or process according to the present invention for calibrating image data from non-overlapping cameras.

The drawings are not necessarily to scale. The drawings are merely schematic representations, not intended to portray specific parameters of the invention. The drawings are intended to depict only typical aspects, examples and embodiments of the invention, and therefore should not be considered as limiting the scope of the invention. In the drawings, like numbering represents like elements.

DETAILED DESCRIPTION

Video analytics systems may use background subtraction (BGS) to distinguish foreground objects of interest from background models defined with respect to visual data in video input data. Such BGS systems are being increasingly deployed to determine and track pedestrian and vehicle movements and activities in a variety of different scenes and contexts, including public roadways, mass transit stations, etc. Through automated BGS analysis, the capabilities of human monitors of these areas may be greatly extended, in some examples allowing one person to monitor increasing numbers of cameras and scenes for public safety issues associated with such object movements.

FIG. 1 illustrates a method, system or process according to the present invention for calibrating image data from non-overlapping cameras. At 102 a processing unit of a computer system tracks each of a plurality of individual objects distinguished within scenes of image data from each of plurality of non-overlapping cameras. More particularly, the scenes of the images of the different cameras are geographically remote and distinct from each other and do not overlap, so that an object visible within any one scene cannot be visible within a scene from another camera at the same time.

In some aspects, object tracking at 102 includes performing background subtraction (BGS) in each individual camera to recover the objects in the respective scenes. In some aspects, object tracking at 102 includes using object detectors configured to detect objects having certain attributes distinguishable from other objects, for example using vehicle or pedestrian detectors to recover and distinguish respective vehicle or pedestrian objects in the scene from other objects (moving or stationary).

Tracking at 102 may include using a multi-cost optimization framework for tracking objects distinguished in the scenes that incorporates color, distance, size and overlap costs, thus distinguishing and tracking through a plurality of different consecutive image frames an object via discrete frame object images that each have a least cost of association with object images of previous frames of the video data. Some aspects also use geographic constraints of the image scene data to improve tracking, for example knowledge of roadway structure constraints in the image such as lanes, wall, curbs, etc., may preclude associating frame object images to previous frame images that would represent an impermissible or impossible movement, such as tracking a vehicle object through a building and onto the wrong way of another roadway within a road network having a known geometry.

At 104 the processing unit performs iterative across-camera image-matching to track the movements of the objects from frame data of scenes of initial ones of the cameras to subsequent-in-time frame data of scenes of other, ending ones of the cameras. In other words, the matching finds images of objects that have moved through and out of first initial camera scenes and entered into subsequent camera scenes signifying endings of tracks defined by movement of the objects, or portions thereof, as defined by tracks of the moving objects. A set of N cameras (for example, N=10) and a much larger set of M tracked objects in each camera (for example, M=1,000) may present computational challenges in tracking each of the objects across each of the cameras in the prior art. Aspects of the present invention use a greedy approach at 104 for across camera image-matching, wherein for each camera the processing unit matches each of the objects moving through and exiting that camera to objects that are entering one of the other cameras, in some aspects using a generous time interval that accommodates variations in speed of motion of the object in traveling from one camera to another.

Matching of any two images across cameras at 104 is robust, and aspects employ a high-dimensional feature vector composed of histograms of color and texture. Aspects use red, green, and blue channels, and also Histogram of Oriented Gradients (HOG) features for comparison. Given an initial greedy approach, the processing unit is able to cut down the numbers of cameras that need to be searched across significantly, as only those cameras that have more than a requisite matching percentage are searched additionally in order to find the tracked object.

For pairings of the non-overlapping cameras (those determined to share tracked objects at 104), at 106 each of the paths of motion of the tracked objects are determined through each of the scenes, the paths defined and referenced by pairings of respective scene entry and exit points. At 108 a voting histogram of bins is defined, wherein each of the bins represents one possible combination of the motion path (entry and exit point pairings) for pairs of matching cameras. At 109 votes representing tracked movements of objects along the respective path combinations are entered into corresponding bins. Thus, for every tracked object appearing in both of the pairing cameras, a vote is entered into the bin corresponding to the combination of the path through the initial camera scene and the path through the ending camera scene that is travelled by the tracked object. At 110 the respective initial scene exit and ending scene entry points of the path combination of the bin having the highest voting value defines the path connection for the paired camera scenes.

Thus, aspects of the present invention determine a path connection at 110 between the matching object cameras as a function of knowledge of how the movement of the tracked objects through the first scene of the first camera links to the movement of the objects through the second scene of the other, with the paths of the most frequently observed motions used to identify a dominant path combination, the one most frequently travelled by all tracked objects. In aspects implemented to track vehicle movements, the path connection is presumptively a road connection, wherein each of the scenes includes a road (street, parking lot or building driveway, etc.) along which the vehicle objects move in the observed direction. In aspects that track pedestrian objects through different scenes, the paths are egress, walkway or corridor structures that guide pedestrians in a predominant direction, and still other spatial linkages for guided movements of other tracked objects through respective camera scenes (animals along forest pathways, boats along waterways, etc.) will be apparent to one skilled in the art.

Figure 2:
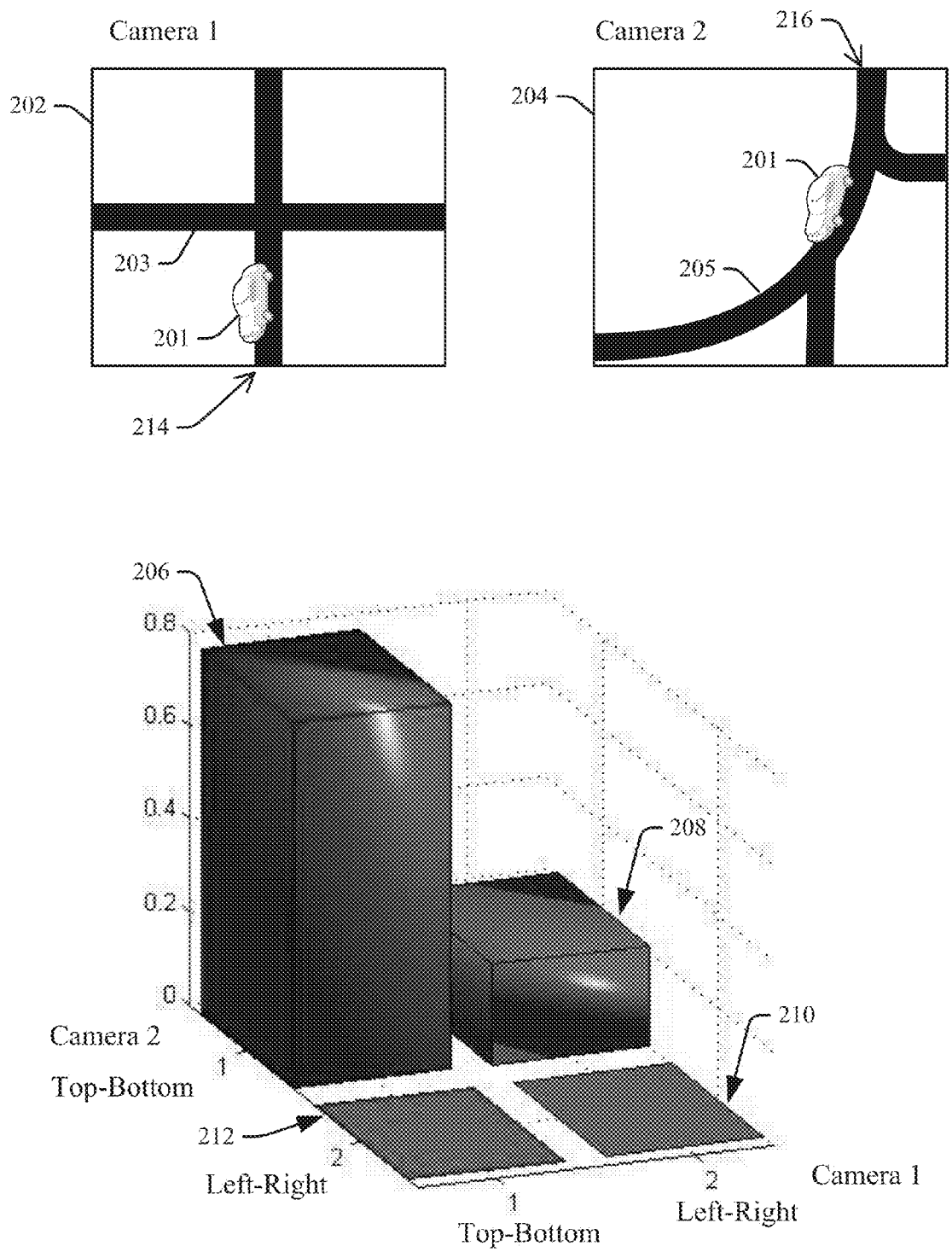
FIG. 2 illustrates a graphical representation of a histogram used to determine a road connection between graphically-depicted scenes of a matching camera pair according to the present invention.

FIG. 2 provides one example of a histogram used to determine a road connection at 110 between the respective roads 203 and 205 of scenes 202 and 204 of the matching Cameras 1 and 2, wherein Camera 1 is the initial camera (the one that a vehicle object 201 appears in first) and Camera 2 is the ending camera (the one that a vehicle object 201 appears in subsequently). In this example, two paths of object movement are determined at 106 for each scene, a top-to-bottom path and a left-to-right path, and accordingly the histogram is a two-by-two histogram, defined by four bins for each possible combination of the paths. Eighty percent (80%) of the votes tallied (at 109) in response to observing the movement of tracked objects matched between the scenes 202 and 204 are in bin 206, representing a combination of top-to-bottom paths through both Camera 1 scene 202 and Camera 2 scene 204; 20% are in bin 208, indicating votes from a combination of a top-to-bottom path through Camera 1 scene 202 and a left-to-right path through Camera 2 scene 204; no votes are observed in the other bins 210 and 212. Thus, the road connection defined by movement of the objects between the scenes 202 and 204 is indicated by bin 206 as the bottom exit point 214 of scene 202 of Camera 1 in association with the top entry point 216 of scene 204 of Camera 2.

Figure 3:
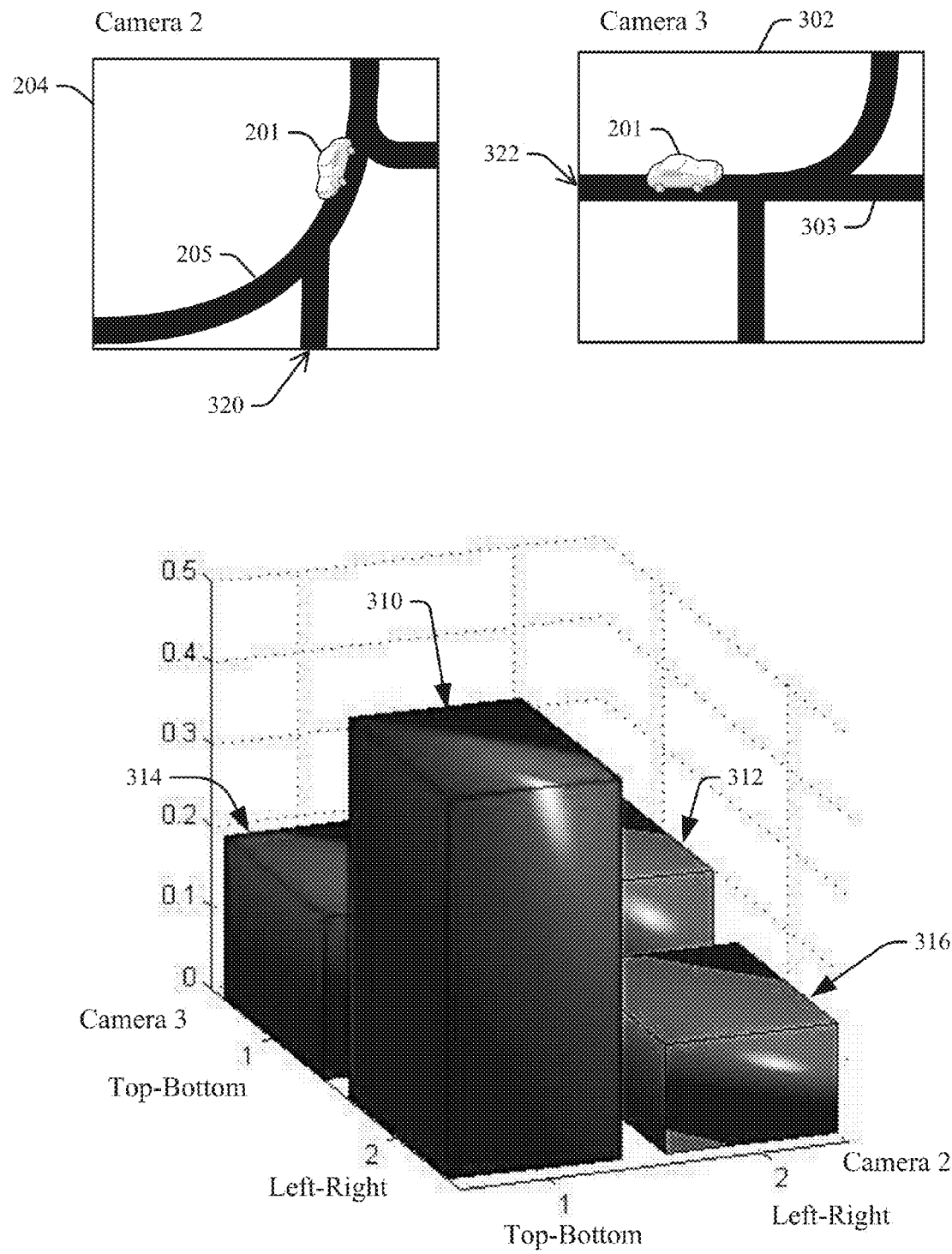
FIG. 3 illustrates a graphical representation of another histogram used to determine a road connection between graphically-depicted scenes of another matching camera pair according to the present invention.

FIG. 3 illustrates another histogram used to determine a road connection between the Camera 2 scene 204 and another scene 302 of a third camera, Camera 3, in which the vehicle 201 appears on roads 303 therein after appearing in the Camera 2 scene 204. Scene 302 of Camera 3 has top-to-bottom and left-to-right paths of object movement determined at 106, and accordingly another two-by-two histogram is defined to determine the road connection to Camera 2 scene 204 for the object movements. In this example, bin 310 has the highest vote total with 50% of the votes, representing a combination of a top-to-bottom path through Camera 2 scene 204 and a left-to-right path through Camera 3 scene 302. Two of the other bins 312 and 314 each have 20%, and the other bin 316 has the remaining 10% of the votes. Thus, the road connection defined by movement of the objects between the scenes 204 and 302 is indicated by bin 310 as the bottom exit point 320 of scene 204 of Camera 2 in association with the left entry point 322 of scene Camera 3 scene 302.

For simplicity of illustration, the Camera 1, 2 and 3 scene examples discussed in FIGS. 2 and 3 have only two possible paths with unique entry and exit points. However, this is not limiting, and the voting histograms of aspects of the invention have sizes and dimensions defined by the paths observed or possible in each scene. Thus, the size of the combination histogram at 110 for a first scene having X entry points and Y exit points, and a second scene having K entry points and J exit points, will be equal to (X*Y)*(K*J).

Referring again to FIG. 1, given the road connections determined at 110 aspects of the present invention determine a multi-modal time delay estimate between appearances of tracked objects in the matching cameras. At 112 a large universe or total range of time-delay values that are possibly or potentially observable between the appearances of objects in matching cameras is determined by the processing unit, for example as a function of historic object movement data, or as specified by a user. At 114 a plurality of different, consecutive-in-time time-delay histogram bins are defined within the range of potential time-delays, wherein each spans a different subset range of the total universe or range of possible values of the observed time-delays. At 115 votes for each matched pair of object images are entered in ones of the time-delay histogram bins that correspond to their respective delays between matched pair image occurrences, and the votes are tabulated to generate time-delay histograms for the matched cameras at 116.

Figure 4:
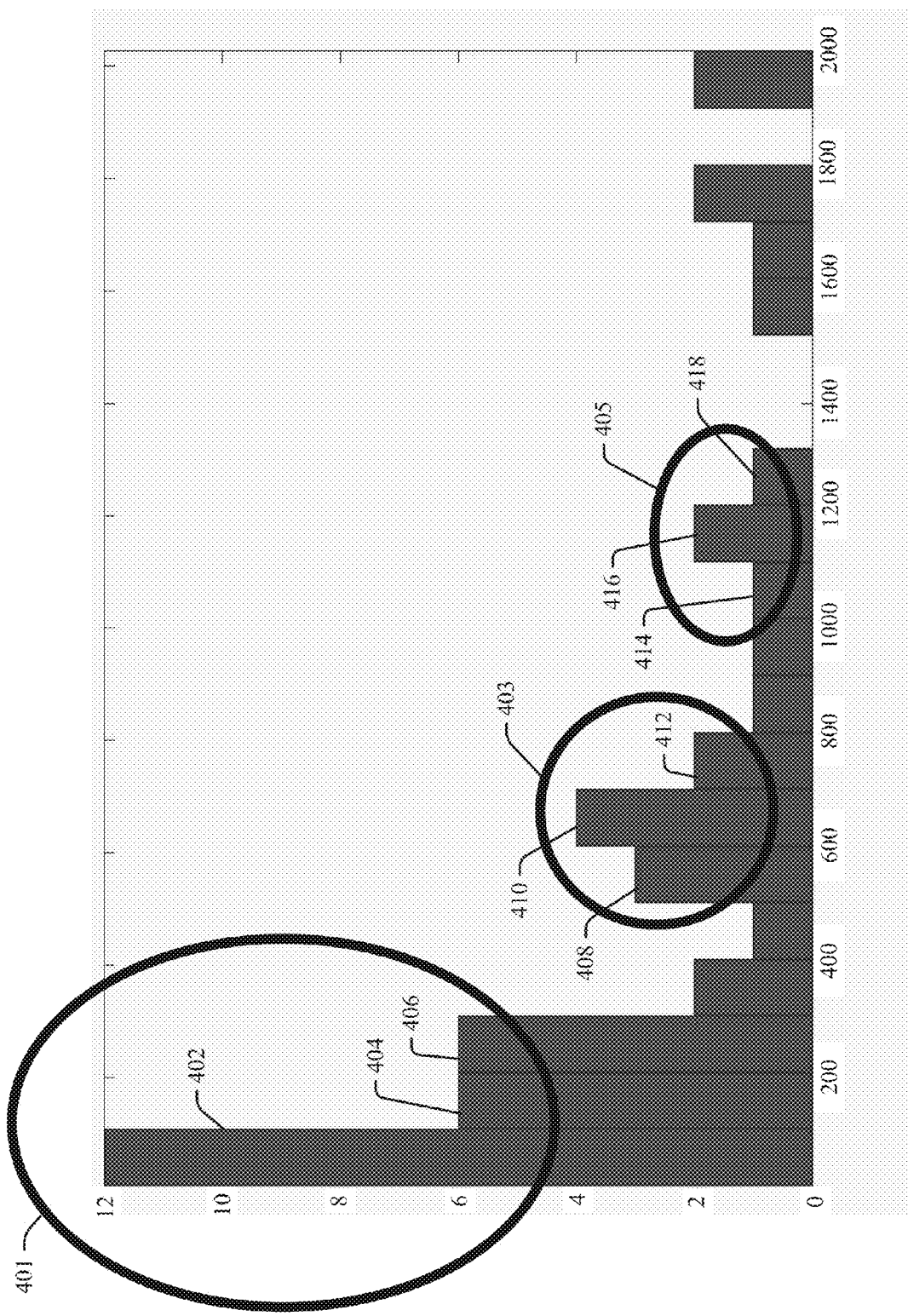
FIG. 4 illustrates a graphical representation of a time-delay histogram according to the present invention.

FIG. 4 illustrates a time-delay histogram generated at 116, with respect to a range of bins specified or determined at 112 of zero to 2000 frames of image data at 10 frames of data per second (thus, spanning 200 seconds of total time). Each of the bins are defined at 114 as spanning consecutive subset ranges of the total range; in this example, the bins are each 100 frames or 10 seconds wide and adjacent to others of the bins over the total range of 2000 frames/200 seconds. Review of the time-delay histogram shows that a first bin 402 spanning from zero seconds/frames to 100 frames/10 seconds of delay between matching appearances has the largest number of match votes (twelve), and the next two 404 and 406 each have six votes, and therefore that most tracked vehicle objects are visible within the second camera in a clustering 401 that occurs within 30 seconds (300 frames) of appearance in the first of the matched cameras.

However, another, smaller second clustering of votes 403 also occurs in a group of bins 408, 410 and 412. A third, even smaller clustering of votes 405 occurs in another group of bins 414, 416 and 418. In the present example, this multi-modal clustering 401/403/405 is due to the effect of traffic lights on traffic motion between the camera views. If the traffic lights are green, the matching objects show up much sooner, reflected by the large, first cluster of bins 401, and wherein the smaller second and third clusters 403 and 405 reflect delays caused when the traffic lights are red and delay the matched vehicles objects from progressing to the next camera view.

Referring again to FIG. 1, aspects of the present invention accommodate for this multi-modality behavior at 118 by modeling the histogram time-delay bin values with Kernel Density Estimators (KDE), which is a non-parametric estimation technique. More particularly, at 118 a plurality of KDE estimators are each fit to a particular time-delay histogram between each pair of matching cameras as a function of the voting values populated in the histogram time-delay bins at 116. By providing a plurality of finely-tuned KDE estimators fit between every pair of matching cameras, aspects of the present invention capture complex time-delay effects and relationships of the network of non-overlapping cameras in a probabilistic process, in contrast to binary, deterministic processes found in the prior art. Some such complex time-delays may include the effects of traffic lights on travel speed, the effect of time of the day on the travel speed, among others.

Aspects of the present invention determine a relative camera network calibration for strong pairing of matched objects as a function of the pair-wise camera connections determined for the cameras matched at 104, connected at 110, and in view of the time-delays modeled for each at 118. More particularly, given that pair-wise relationships between the cameras are determined both in terms of path connections and in terms of time-delay effects, aspects recover a longer-scale relationship between these cameras. Thus, at 120 a two-dimensional, "N-by-N" cost matrix is defined for the total number "N" of the non-overlapping cameras including unique camera pairing entries, organized by first dimension (row, column, axis, etc.) listing each of the N cameras as an initial camera, and the other dimension listing each of the same N cameras as an ending camera for a possible path of motion of the tracked objects between the respective camera scenes.

At 122 affinity costs are determined for each of the cost matrix unique camera pairing entries as: (i) a sum-total of the modeled travel times through the initial and ending cameras all intervening connected cameras; or (ii) an infinite value in response to the determined path connections do not link the end camera to the initial camera, which reflects that the end camera is unreachable by the initial camera in this pairing. More particularly, the affinity costs represent total modeled travel time estimates or how long it takes for a tracked object to travel and reach the scene of the ending camera from the scene of the initial camera in each pair, as a function of the path connections determined at 110 and the histogram time-delay bin values modeled at 118.

At 124 the cost values of the N-by-N matrix are clustered into multiple components to define a network topology of camera connections as a function of similarity of cost values, thus based on relative affinity (or proximity) costs of the different cameras to each other. Thus, the topology determined at 124 may be used at 126 for a given initial camera to choose an ending camera from a pairing with another, ending camera that is within a clustered lowest affinity cost subset of the cost matrix pairings, and that has a modeled delay time corresponding to an elapsed time since an image of a tracked object appeared in the given initial camera scene. As will be appreciated by one skilled in the art, clustering at 124 may be performed in a variety of ways. In one example that tracks vehicles, clustering at 124 includes picking a camera having a highest transition probability as a natural connection camera. However, this example may not capture traffic patterns in a comprehensive manner, and accordingly another example takes a top subset [k] of the cameras according to the affinity matrix as the transition cameras to come up with a better model. In one aspect, picking the [k] best cameras is the same problem as sorting all affinities and picking the top [k] entries.

In one aspect, the topology recovers the natural pathway connections that exist in the real-world, geographic settings and relationships between the scenes of the respective cameras as a function of the actual movements of the tracked objects between the different camera scenes. The observed motion data of the tracked objects is thereby used to calibrate the camera network in establishing the relative affinities of the non-overlapping cameras when compared to others of the cameras, estimating strengths (costs) of connection between any two cameras in the network.

Aspects of the present invention may be deployed in automobile and traffic monitoring implementations, for example in order to track in real-time one or more moving automobiles, or an overall, aggregate traffic flow of many vehicles, traversing one or more streets. Implementations may be useful to track certain vehicles, as well as to determine the occurrence congestion patterns during certain time periods (for example, morning, afternoon or evening rush hours or other peak traffic flow events), or how many vehicles or types of vehicles are traveling through a particular road at any time. Non-vehicle object tracking aspects include tracking pedestrians or animals as discussed above. Some aspects track and analyze shopper behavior recorded across multiple or aggregate cameras in retail shopping locations, in some examples to determine appropriate personalized offers or discounts based on real-time behavior observations of location and travel times to destinations associated with the offers and discounts. Still other object tracking implementations will be apparent to one skilled in the art.

Thus, rather than calibrate cameras as a function of their physical locations, aspects of the present invention automatically determine camera-to-camera transition matrixes and associated times of travel that enable a computing network environment incorporating the camera video inputs to perform camera hand-off tracking independent of a need for relative physical location calibrations.

In view of the fact that objects can transition from one camera into many other cameras non-overlapping camera scenes, aspects determine time delays for objects to appear in the next camera scenes in a probabilistic process that recognizes that cameras may not be placed uniformly, and that objects do not travel at the same speed. By searching for objects in other camera scenes as a function of probable times of appearance within that scene as determined from camera pairing data the strength of the search result may be adjusted. For example, the silver sedan that appears within the most likely time bin of a second camera is more likely a match to an earlier appearance in another paired camera than another silver sedan object found to appear within a different time delay bin.

Efficiencies are provided in aspects by obviating the need to individually calibrate matching camera relationships via geographic and other data considerations. Since the camera pairing relationships can be determined purely from comparing the object tracking data from each as a function of matching objects, non-overlapping field-of-view calibration may be greatly up-scaled over prior art systems, for example to hundreds of cameras compared to the tens of cameras that prior art systems may effectively calibrate and administer. Large-scale image matching may also be performed using the sources of cloud computing and other large computing network environments. Aspects do not impose upper limit requirements on targets or site models, but instead use boot-strapping processes that use city traffic composed of hundreds of objects to calibrate the camera relationships, wherein the more camera data provided the better the probabilistic results, in particular in response to multi-modal distributions of time of travel. Aspects are thereby robust in response to variations in time of travel between cameras, which may be assumed to change to different quantities based on different and varying traffic light configurations and congestions that may occur in each of the different camera scenes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. Examples of a computer readable storage medium exclude transitory, propagation or carrier wave signals or subject matter and include an electronic, magnetic, optical or semiconductor system, apparatus, or device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is not a transitory, propagation or carrier wave signal, but instead may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic or optical forms or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
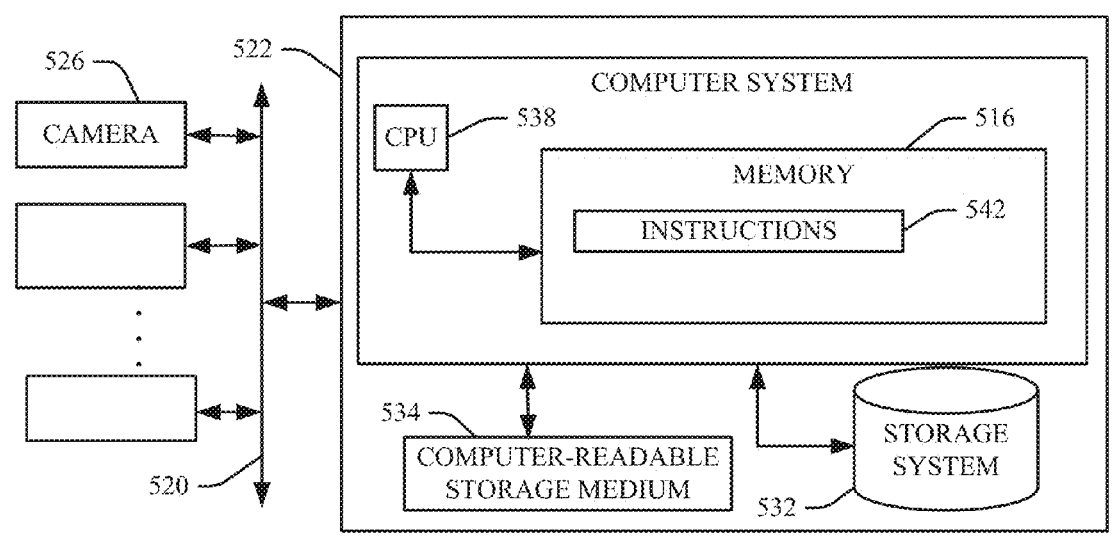
FIG. 5 is a block diagram illustration of a computer system implementation of an aspect of the present invention.

Referring now to FIG. 5, an exemplary computerized implementation of an aspect of the present invention includes a computer system or other programmable device 522 in communication with a plurality of different video image input devices 526 (cameras, video data storage devices, image sensors, etc.) that calibrates image data from non-overlapping cameras as described above with respect to FIGS. 1 through 4. Instructions 542 reside within computer readable code in a computer readable memory 516, or in a computer readable storage system 532, or other tangible computer readable storage medium 534 that is accessed through a computer network infrastructure 520 by a Central Processing Unit (CPU) 538. Thus, the instructions, when implemented by the processing unit 538, cause the processing unit 538 to calibrate the image data received from a plurality of non-overlapping cameras as described above with respect to FIGS. 1 through 4.

The network computing environment 520 may sometimes be referred to as a cloud computing environment that enables a plurality of different computer resources to interact cooperatively, abstracted (in some examples into a cloud layer) so that disparate devices appear to an end-user as a single pool of seamless resources. Examples of computer resources amenable to network computing or cloud environments include physical programmable devices 522 or 526 (for example, programmable imaging devices or cameras, servers, clients, etc.), storage and other memory devices 532 or 534, etc.; and logical computing applications and engines (for example, business and other software applications).

In one aspect, the present invention may also perform process steps of the invention on a subscription, advertising, and/or fee basis. That is, a service provider could offer to integrate computer-readable program code into the computer system 522 to enable the computer system 522 to calibrate image data from non-overlapping cameras as described above with respect to FIGS. 1 through 4. The service provider can create, maintain, and support, etc., a computer infrastructure, such as the computer system 522, network environment 520, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 522, from a tangible computer-readable medium device 532 or 534; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The aspect was chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various aspects of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for calibrating image data from non-overlapping cameras, the method comprising executing on a processing unit the steps of:

tracking each of a plurality of individual objects distinguished within scenes of image data from each of plurality of non-overlapping cameras, wherein scenes of the images of different ones of the non-overlapping cameras are geographically remote and distinct from each other and do not overlap so that an object visible within any one scene cannot be visible within a scene from another camera at the same time;

performing iterative across-camera image-matching to track the movements of objects distinguished from frame data of scenes of initial ones of the cameras to subsequent-in-time frame data of scenes of other, ending ones of the cameras, wherein the initial and ending cameras are defined by tracks of the objects moving from the initial camera scene to the ending camera scene;

determining for pairings of the initial and ending cameras each of at least one path of motion of the tracked objects through each of the scenes of the initial and ending cameras, wherein the paths through the scenes are each defined by different respective scene entry and exit points;

for each of the determined pairings of the initial and ending cameras, selecting a combination of one of the at least one paths through the initial camera scene and a path of one of the at least one paths through the ending camera scene as a path connection combination, in response to the selected combination having a highest total number of tracked movements of objects along the selected combination of the paths relative to a total number of tracked movements of objects along all other combinations of one of the at least one paths through the initial camera scene and one of the at least one paths of motion of the tracked objects through the ending camera scene;

for each of the determined pairings of the initial and ending cameras, determining a path connection of the initial camera scene to the ending camera scene as the scene exit point of the path connection combination path through the initial camera scene of the each pairing, and the scene entry point of the path connection combination path through the ending camera scene of the each pairing;

determining each of a plurality of different time-delay values observed between appearances of objects matched in the scenes of the determined pairings of the initial and ending cameras;

defining a plurality of different and consecutive-in-time time-delay histogram bins within a total range of possible values of the observed time-delays, wherein the time-delay histogram bins each span consecutive subset ranges of delay times of the total range of possible values of the observed time-delays;

for each matched pair of object images. entering a vote into a one of the time-delay histogram bins having a subset range of delay times that comprises a delay time between an appearance of the object image in the initial camera scene and an appearance in the ending camera scene;

modeling, via kernel density estimators, totals of the votes entered into each of the different time-delay histogram bins;

defining a two-dimensional affinity cost matrix for associating the path connection combinations with pluralities of unique camera pairing entries, wherein the matrix is organized on a first dimension defined by each of a plurality of the non-overlapping cameras as initial cameras for a possible path of motion of the tracked objects between respective camera scenes, and on a remainder second dimension defined by each of the non-overlapping cameras as an ending camera for the possible path of motion of the tracked objects between respective camera scenes; and for each of the cost matrix unique camera pairing entries, determining an affinity cost as a sum total of the kernel density estimator model totals of all intervening connected cameras for the determined path connections that link the initial and ending cameras, and as an infinite value for the determined path connections that do not link the ending camera to the initial camera.

2. The method of claim 1, wherein the step of selecting the combination of the path through the initial camera scene and the path through the ending camera scene having the highest total number of tracked movements of objects comprises:

defining a voting histogram of a plurality of bins, wherein each of the bins represents different combinations of one of the at least one paths through the initial camera scene and one of the at least one paths through the ending camera scene;

for every tracked object appearing in both of the pairing cameras, entering a vote into a one of the bins corresponding to the combination of the path through the initial camera scene and the path through the ending camera scene travelled by the tracked object; and selecting the combination represented by the bin having a largest total number of votes as the path connection combination.

3. The method of claim 1, further comprising:

defining a network topology of camera connection components via clustering the cost values of the cost matrix entries into each of the plurality of components as a function of similarity of cost values; and for a given initial camera of the pairings of the cameras, choosing an ending camera from the pairings with the given initial camera that has a cost matrix affinity cost entry that is within a clustered lowest affinity cost subset of the cost matrix pairing entries, and that has a modeled delay time corresponding to an elapsed time since an image of a tracked object appeared in the given initial camera scene.

4. The method of claim 3, further comprising:

distinguishing the individual objects tracked within the scenes of image data from each of the non-overlapping cameras by performing background subtraction to recover the objects in respective ones of the scenes.

5. The method of claim 4, wherein the step of tracking the individual objects within the scenes of image data from each of the non-overlapping cameras comprises using a multi-cost optimization framework for tracking objects distinguished in the scenes that incorporates color, distance, size and overlap costs to distinguish and track through a plurality of different consecutive image frames an object via discrete frame object images that each have a least cost of association with object images of previous frames of the video data.

6. The method of claim 5, wherein the step of performing iterative across-camera image-matching to track the movement of the one object from frame data of the first scene of the first camera to the subsequent-in-time frame data of the second scene of the second camera comprises using a greedy approach to search a subset of the camera that has more than a requisite matching percentage, and wherein the search of the subset is over a time interval that accommodates variations in speed of motion of the object in traveling from the first camera to the second camera.

7. A method of providing a service for calibrating image data from non-overlapping cameras, the method comprising:

integrating computer-readable program code into a computer system comprising the processing unit, a computer readable memory and a computer readable tangible storage medium, wherein the computer readable program code is embodied on the computer readable tangible storage medium and comprises instructions that, when executed by the processing unit via the computer readable memory, cause the processing unit to perform steps of:

tracking each of a plurality of individual objects distinguished within scenes of image data from each of plurality of non-overlapping cameras, wherein scenes of the images of different ones of the non-overlapping cameras are geographically remote and distinct from each other and do not overlap so that an object visible within any one scene cannot be visible within a scene from another camera at the same time;

performing iterative across-camera image-matching to track the movements of objects distinguished from frame data of scenes of initial ones of the cameras to subsequent-in-time frame data of scenes of other, ending ones of the cameras, wherein the initial and ending cameras are defined by tracks of the objects moving from the initial camera scene to the ending camera scene;

determining for pairings of the initial and ending cameras each of at least one path of motion of the tracked objects through each of the scenes of the initial and ending cameras, wherein the paths through the scenes are each defined by different respective scene entry and exit points;

for each of the determined pairings of the initial and ending cameras, selecting a combination of one of the at least one paths through the initial camera scene and a path of one of the at least one paths through the ending camera scene as a path connection combination, in response to the selected combination having a highest total number of tracked movements of objects along the selected combination of the paths relative to a total number of tracked movements of objects along all other combinations of one of the at least one paths through the initial camera scene and one of the at least one paths of motion of the tracked objects through the ending camera scene;

for each of the determined pairings of the initial and ending cameras, determining a path connection of the initial camera scene to the ending camera scene as the scene exit point of the path connection combination path through the initial camera scene of the each pairing, and the scene entry point of the path connection combination path through the ending camera scene of the each pairing;

determining each of a plurality of different time-delay values observed between appearances of objects matched in the scenes of the determined pairings of the initial and ending cameras;

defining a plurality of different and consecutive-in-time time-delay histogram bins within a total range of possible values of the observed time-delays, wherein the time-delay histogram bins each span consecutive subset ranges of delay times of the total range of possible values of the observed time-delays;

for each matched pair of object images, entering a vote into a one of the time-delay histogram bins having a subset range of delay times that comprises a delay time between an appearance of the object image in the initial camera scene and an appearance in the ending camera scene;

modeling, via kernel density estimators, totals of the votes entered into each of the different time-delay histogram bins;

defining a two-dimensional affinity cost matrix for associating the path connection combinations with pluralities of unique camera pairing entries, wherein the matrix is organized on a first dimension defined by each of a plurality of the non-overlapping cameras as initial cameras for a possible path of motion of the tracked objects between respective camera scenes, and on a remainder second dimension defined by each of the non-overlapping cameras as an ending camera for the possible path of motion of the tracked objects between respective camera scenes; and for each of the cost matrix unique camera pairing entries, determining an affinity cost as a sum-total of the kernel density estimator model totals of all intervening connected cameras for the determined path connections that link the initial and ending cameras, and as an infinite value for the determined path connections that do not link the ending camera to the initial camera.

8. The method of claim 7, further comprising:
the processing unit, when executing the program instructions stored on the tangible computer-readable storage medium via the computer readable memory, selecting the combination of the path through the initial camera scene and the path through the ending camera scene having the highest total number of tracked movements of objects by:
defining a voting histogram of a plurality of bins, wherein each of the bins represents different combinations of one of the at least one paths through the initial camera scene and one of the at least one paths through the ending camera scene;
for every tracked object appearing in both of the pairing cameras, entering a vote into a one of the bins corresponding to the combination of the path through the initial camera scene and the path through the ending camera scene travelled by the tracked object; and
selecting the combination represented by the bin having a largest total number of votes as the path connection combination.

9. The method of claim 7, further comprising:
the processing unit, when executing the program instructions stored on the tangible computer-readable storage medium via the computer readable memory, further:
defining a network topology of camera connection components via clustering the cost values of the cost matrix entries into each of the plurality of components as a function of similarity of cost values; and
for a given initial camera of the pairings of the cameras, choosing an ending camera from the pairings with the given initial camera that has a cost matrix affinity cost entry that is within a clustered lowest affinity cost subset of the cost matrix pairing entries, and that has a modeled delay time corresponding to an elapsed time since an image of a tracked object appeared in the given initial camera scene.

10. The method of claim 9, further comprising:
the processing unit, when executing the program instructions stored on the tangible computer-readable storage medium via the computer readable memory, further:
tracking the individual objects within the scenes of image data from each of the non-overlapping cameras comprises using a multi-cost optimization framework for tracking objects distinguished in the scenes that incorporates color, distance, size and overlap costs to distinguish and track through a plurality of different consecutive image frames an object via discrete frame object images that each have a least cost of association with object images of previous frames of the video data.

11. The method of claim 10, further comprising:
the processing unit, when executing the program instructions stored on the tangible computer-readable storage medium via the computer readable memory, further:
performing iterative across-camera image-matching to track the movement of the one object from frame data of the first scene of the first camera to the subsequent-in-time frame data of the second scene of the second camera by using a greedy approach to search a subset of the camera that has more than a requisite matching percentage; and
searching the subset over a time interval that accommodates variations in speed of motion of the object in traveling from the first camera to the second camera.

12. A system, comprising:
a processing unit in communication with a computer readable memory and a tangible computer-readable storage medium;
wherein the processing unit, when executing program instructions stored on the tangible computer-readable storage medium via the computer readable memory:
tracks each of a plurality of individual objects distinguished within scenes of image data from each of plurality of non-overlapping cameras, wherein scenes of the images of different ones of the non-overlapping cameras are geographically remote and distinct from each other and do not overlap so that an object visible within any one scene cannot be visible within a scene from another camera at the same time;
performs iterative across-camera image-matching to track the movements of objects distinguished from frame data of scenes of initial ones of the cameras to subsequent-in-time frame data of scenes of other, ending ones of the cameras, wherein the initial and ending cameras are defined by tracks of the objects moving from the initial camera scene to the ending camera scene;
determines for pairings of the initial and ending cameras each of at least one path of motion of the tracked objects through each of the scenes of the initial and ending cameras, wherein the paths through the scenes are each defined by different respective scene entry and exit points;
for each of the determined pairings of the initial and ending cameras, selects a combination of one of the at least one paths through the initial camera scene and a path of one of the at least one paths through the ending camera scene as a path connection combination, in response to the selected combination having a highest total number of tracked movements of objects along the selected combination of the paths relative to a total number of tracked movements of objects along all other combinations of one of the at least one paths through the initial camera scene and one of the at least one paths of motion of the tracked objects through the ending camera scene; and for each of the determined pairings of the initial and ending cameras, determines a path connection of the initial camera scene to the ending camera scene as the scene exit point of the path connection combination path through the initial camera scene of the each pairing, and the scene entry point of the path connection combination path through the ending camera scene of the each pairing;

determines each of a plurality of different time-delay values observed between appearances of objects matched in the scenes of the determined pairings of the initial and ending cameras;

defines a plurality of different and consecutive-in-time time-delay histogram bins within a total range of possible values of the observed time-delays, wherein the time-delay histogram bins each span consecutive subset ranges of delay times of the total range of possible values of the observed time-delays;

for each matched pair of object images, enters a vote into a one of the time-delay histogram bins having a subset range of delay times that comprises a delay time between an appearance of the object image in the initial camera scene and an appearance in the ending camera scene;

models, via kernel density estimators, totals of the votes entered into each of the different time-delay histogram bins;

defines a two-dimensional affinity cost matrix for associating the path connection combinations with pluralities of unique camera pairing entries, wherein the matrix is organized on a first dimension defined by each of a plurality of the non-overlapping cameras as initial cameras for a possible path of motion of the tracked objects between respective camera scenes, and on a remainder second dimension defined by each of the non-overlapping cameras as an ending camera for the possible path of motion of the tracked objects between respective camera scenes; and for each of the cost matrix unique camera pairing entries, determines an affinity cost as a sum-total of the kernel density estimator model totals of all intervening connected cameras for the determined path connections that link the initial and ending cameras, and as an infinite value for the determined path connections that do not link the ending camera to the initial camera.

13. The system of claim 12, wherein the processing unit, when executing the program instructions stored on the computer-readable storage medium via the computer readable memory, selects the combination of the path through the initial camera scene and the path through the ending camera scene having the highest total number of tracked movements of objects by:

defining a voting histogram of a plurality of bins, wherein each of the bins represents different combinations of one of the at least one paths through the initial camera scene and one of the at least one paths through the ending camera scene;

for every tracked object appearing in both of the pairing cameras, entering a vote into a one of the bins corresponding to the combination of the path through the initial camera scene and the path through the ending camera scene travelled by the tracked object; and selecting the combination represented by the bin having a largest total number of votes as the path connection combination.

14. The system of claim 12, wherein the processing unit, when executing the program instructions stored on the computer-readable storage medium via the computer readable memory, further:

defines a network topology of camera connection components via clustering the cost values of the cost matrix entries into each of the plurality of components as a function of similarity of cost values; and for a given initial camera of the pairings of the cameras, chooses an ending camera from the pairings with the given initial camera that has a cost matrix affinity cost entry that is within a clustered lowest affinity cost subset of the cost matrix pairing entries, and that has a modeled delay time corresponding to an elapsed time since an image of a tracked object appeared in the given initial camera scene.

15. The system of claim 14, wherein the processing unit, when executing the program instructions stored on the computer-readable storage medium via the computer readable memory, further:

tracks the individual objects within the scenes of image data from each of the non-overlapping cameras by using a multi-cost optimization framework for tracking objects distinguished in the scenes that incorporates color, distance, size and overlap costs to distinguish and track through a plurality of different consecutive image frames an object via discrete frame object images that each have a least cost of association with object images of previous frames of the video data.

16. The system of claim 15, wherein the processing unit, when executing the program instructions stored on the computer-readable storage medium via the computer readable memory, further:

performs iterative across-camera image-matching to track the movement of the one object from frame data of the first scene of the first camera to the subsequent-in-time frame data of the second scene of the second camera by using a greedy approach to search a subset of the camera that has more than a requisite matching percentage; and searches the subset over a time interval that accommodates variations in speed of motion of the object in traveling from the first camera to the second camera.

17. A computer program product for calibrating image data from non-overlapping cameras, the computer program product comprising:

a computer readable storage medium having computer readable program code embodied therewith, wherein the computer readable storage medium is not a transitory signal per se, the computer readable program code comprising instructions that, when executed by a computer processing unit, cause the computer processing unit to:

track each of a plurality of individual objects distinguished within scenes of image data from each of plurality of non-overlapping cameras, wherein scenes of the images of different ones of the non-overlapping cameras are geographically remote and distinct from each other and do not overlap so that an object visible within any one scene cannot be visible within a scene from another camera at the same time;

perform iterative across-camera image-matching to track the movements of objects distinguished from frame data of scenes of initial ones of the cameras to subsequent-in-time frame data of scenes of other, ending ones of the cameras, wherein the initial and ending cameras are defined by tracks of the objects moving from the initial camera scene to the ending camera scene;

determine for pairings of the initial and ending cameras each of at least one path of motion of the tracked objects through each of the scenes of the initial and ending cameras, wherein the paths through the scenes are each defined by different respective scene entry and exit points;

for each of the determined pairings of the initial and ending cameras, select a combination of one of the at least one paths through the initial camera scene and a path of one of the at least one paths through the ending camera scene as a path connection combination, in response to the selected combination having a highest total number of tracked movements of objects along the selected combination of the paths relative to a total number of tracked movements of objects along all other combinations of one of the at least one paths through the initial camera scene and one of the at least one paths of motion of the tracked objects through the ending camera scene; and for each of the determined pairings of the initial and ending cameras, determine a path connection of the initial camera scene to the ending camera scene as the scene exit point of the path connection combination path through the initial camera scene of the each pairing, and the scene entry point of the path connection combination path through the ending camera scene of the each pairing;

determine each of a plurality of different time-delay values observed between appearances of objects matched in the scenes of the determined pairings of the initial and ending cameras;

define a plurality of different and consecutive-in-time time-delay histogram bins within a total range of possible values of the observed time-delays, wherein the time-delay histogram bins each span consecutive subset ranges of delay times of the total range of possible values of the observed time-delays;

for each matched pair of object images, enter a vote into a one of the time-delay histogram bins having a subset range of delay times that comprises a delay time between an appearance of the object image in the initial camera scene and an appearance in the ending camera scene;

model, via kernel density estimators, totals of the votes entered into each of the different time-delay histogram bins;

define a two-dimensional affinity cost matrix for associating the path connection combinations with pluralities of unique camera pairing entries, wherein the matrix is organized on a first dimension defined by each of a plurality of the non-overlapping cameras as initial cameras for a possible path of motion of the tracked objects between respective camera scenes, and on a remainder second dimension defined by each of the non-overlapping cameras as an ending camera for the possible path of motion of the tracked objects between respective camera scenes; and for each of the cost matrix unique camera pairing entries, determine an affinity cost as a sum-total of the kernel density estimator model totals of all intervening connected cameras for the determined path connections that link the initial and ending cameras. and as an infinite value for the determined path connections that do not link the ending camera to the initial camera.

18. The computer program product of claim 17, wherein the computer readable program code instructions, when executed by the computer processing unit, further cause the computer processing unit to select the combination of the path through the initial camera scene and the path through the ending camera scene having the highest total number of tracked movements of objects by:

defining a voting histogram of a plurality of bins, wherein each of the bins represents different combinations of one of the at least one paths through the initial camera scene and one of the at least one paths through the ending camera scene;

for every tracked object appearing in both of the pairing cameras, entering a vote into a one of the bins corresponding to the combination of the path through the initial camera scene and the path through the ending camera scene travelled by the tracked object; and selecting the combination represented by the bin having a largest total number of votes as the path connection combination.

19. The computer program product of claim 17, wherein the computer readable program code instructions, when executed by the computer processing unit, further cause the computer processing unit to:

define a network topology of camera connection components via clustering the cost values of the cost matrix entries into each of the plurality of components as a function of similarity of cost values; and for a given initial camera of the pairings of the cameras, choose an ending camera from the pairings with the given initial camera that has a cost matrix affinity cost entry that is within a clustered lowest affinity cost subset of the cost matrix pairing entries, and that has a modeled delay time corresponding to an elapsed time since an image of a tracked object appeared in the given initial camera scene.

20. The computer program product of claim 19, wherein the computer readable program code instructions, when executed by the computer processing unit, further cause the computer processing unit to:

track the individual objects within the scenes of image data from each of the non-overlapping cameras by using a multi-cost optimization framework for tracking objects distinguished in the scenes that incorporates color, distance, size and overlap costs to distinguish and track through a plurality of different consecutive image frames an object via descrete frame object images that each have a least cost of association with object images of previous frames of the video data.

21. The computer program product of claim 20, wherein the computer readable program code instructions, when executed by the computer processing unit, further cause the computer processing unit to:

perform iterative across-camera image-matching to track the movement of the one object from frame data of the first scene of the first camera to the subsequent-in-time frame data of the second scene of the second camera by using a greedy approach to search a subset of the camera that has more than a requisite matching percentage; and search the subset over a time interval that accommodates variations in speed of motion of the object in traveling from the first camera to the second camera.

* * * * *